United States Patent [19]

Champagne et al.

[11] 4,304,413
[45] Dec. 8, 1981

[54] SEAL FOR THE GAS OFFTAKE PIPING OF A COKE OVEN

[75] Inventors: Paul E. Champagne, Monroeville; Calvin E. Kelly, Murrysville; Thomas E. Nicely, Delmont, all of Pa.

[73] Assignee: United States Steel Corporation, Pittsburgh, Pa.

[21] Appl. No.: 128,796

[22] Filed: Mar. 10, 1980

[51] Int. Cl.³ .............................................. F16J 15/40
[52] U.S. Cl. .................................... 277/135; 202/242; 202/247; 202/254; 202/269
[58] Field of Search ...................... 277/135, 13, 14, 17, 277/18, 19, 82; 202/254, 255, 269, 81, 242, 247

[56] References Cited

U.S. PATENT DOCUMENTS

| | | | |
|---|---|---|---|
| 179,221 | 6/1976 | Ricketts | 202/247 |
| 414,938 | 11/1889 | Burcey | 202/81 |
| 2,379,547 | 7/1945 | Sperry | 277/135 |
| 2,424,865 | 7/1947 | Tweit | 202/256 |
| 4,073,697 | 2/1978 | Prötzl | 202/242 |
| 4,103,902 | 8/1978 | Steiner | 277/135 |
| 4,186,056 | 1/1980 | Müller et al. | 202/269 |
| 4,189,457 | 2/1980 | Clement | 49/475 |

Primary Examiner—Robert I. Smith
Attorney, Agent, or Firm—William F. Riesmeyer, III

[57] ABSTRACT

A seal for the offtake piping of a coke oven. The piping includes two communicating parts, such as an ascension pipe and a gooseneck, which move relatively to one another. A seal between these parts prevents escape of gases. The seal includes a trough fixed to one of the parts and receiving the other. The trough contains a body of a non-coking non-flammable liquid, preferably silicone, into which the other part extends. Optionally the trough may also contain a gasket of a closed cell sponge elastomer or a layer of granular material.

8 Claims, 4 Drawing Figures

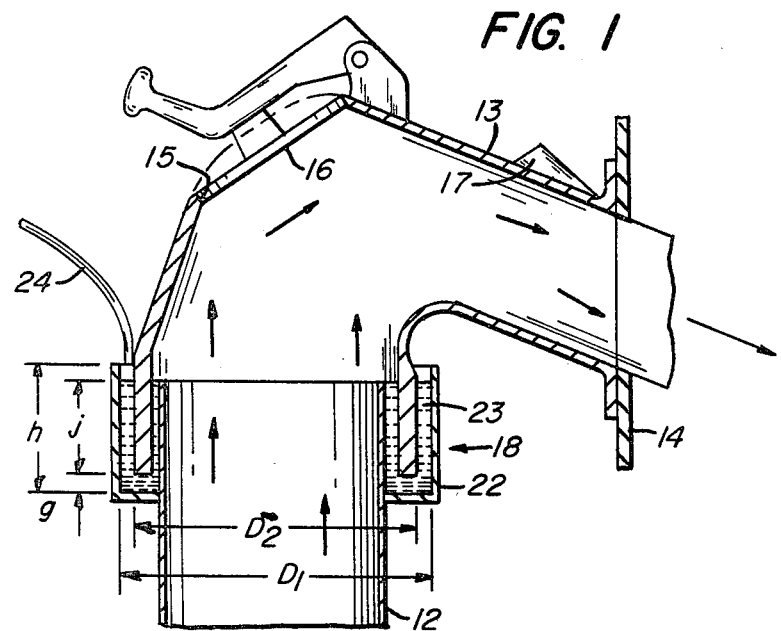
FIG. 1
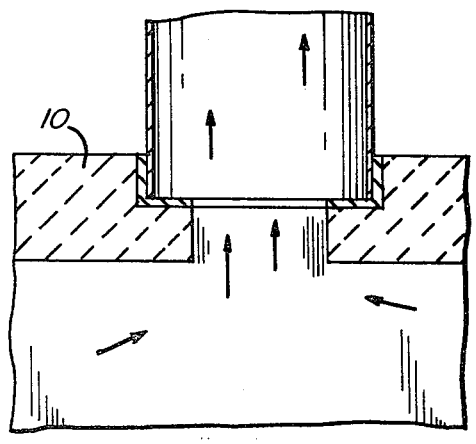
FIG. 2
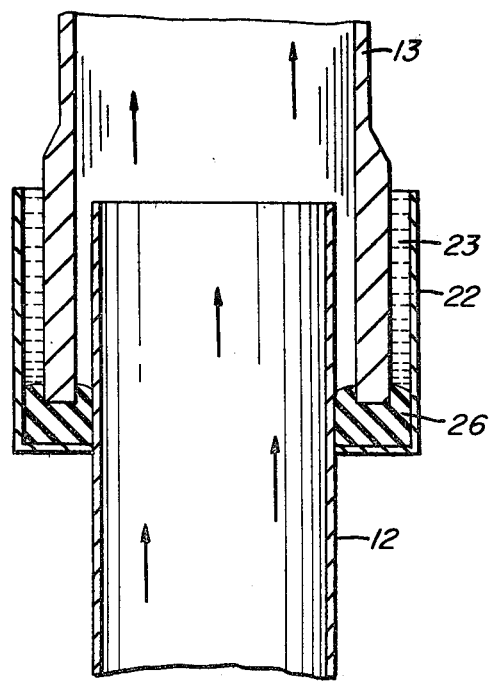

SEAL FOR THE GAS OFFTAKE PIPING OF A COKE OVEN

This invention relates to an improved seal for the gas offtake piping of a coke oven.

The gas offtake piping of a conventional coke oven includes an ascension pipe extending upwardly from the oven roof and a gooseneck communicating with the top of the ascension pipe and leading to a collector main which carries away gases given off from the oven. It is necessary to provide a seal, either between the ascension pipe and gooseneck or between the gooseneck and collector main, to permit relative movement of the parts, yet prevent escape of gases. The most common form of seal includes packing, such as asbestos rope with flyash cement, wrapped around the gooseneck and received in the adjacent part with which the gooseneck communicates. Seals formed of pitch, which is viscous at low temperatures but becomes liquid at the operating temperature, also are known. Reference can be made to Weber U.S. Pat. No. 2,343,034 or Tweit U.S. Pat. No. 2,424,865 for exemplary showings of seals located between an ascension pipe and gooseneck, and to Thompson U.S. Pat. No. 2,759,885 or Gidick U.S. Pat. No. 3,804,721 for seals located between a gooseneck and collector main.

Seals used heretofore have not been wholly satisfactory. Conventional costly packing materials fail by thermal cracking after relatively short usage. Also they interfere with relative movement of the parts, and require excessive maintenance. Pitch seals likewise are high maintenance items. Volatiles in pitch vaporize rapidly at relatively low operating temperatures, leaving a coke residue which solidifies in the joints and not only breaks the seal but also prevents relative movement.

An object of our invention is to provide improved seals for the gas offtake piping of a coke oven by which we overcome difficulties encountered with seals used heretofore, that is, seals which reduce maintenance and operate satisfactorily for long periods without interfering with relative movement or permitting gas to escape.

A more specific object is to provide improved seals which rely on a non-coking non-flammable liquid, preferably silicone, but alternatively other liquids, such as water or a water-glycol solution.

In the drawings:

FIG. 1 is a vertical sectional view of a portion of a coke oven in which the ascension pipe and gooseneck communicate through a seal in accordance with our invention;

FIG. 2 is a vertical sectional view of a portion of an ascension pipe and gooseneck and a modified form of seal in accordance with our invention;

Figure 3:
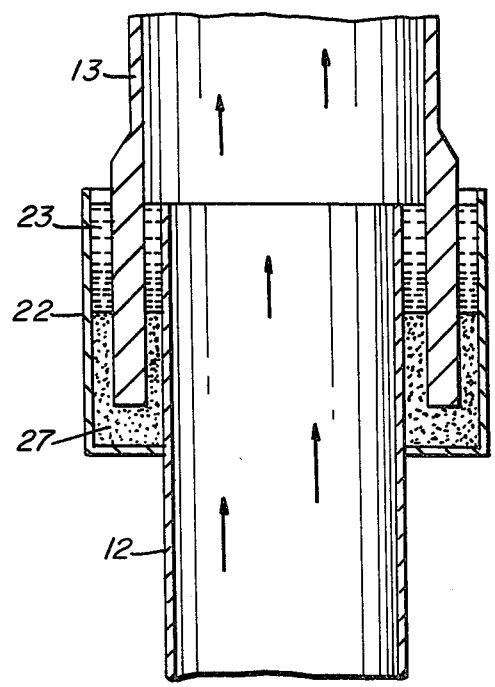
FIG. 3 is a vertical sectional view showing another modified seal of our invention.

FIG. 1 shows a portion of a coke oven which includes a roof 10, an ascension pipe 12 extending upwardly from the roof, and a gooseneck 13 communicating with the top of the ascension pipe and with a collector main 14. The gooseneck has the usual access opening 15, cover 16 over the opening, and nozzle 17 for admitting steam or while coal is charged to the oven. A seal 18 constructed in accordance with our invention is located between the ascension pipe 12 and gooseneck 13. Alternatively the seal could be located between the gooseneck and collector main 14. The coke oven may be conventional apart from the seal and hence is not shown in detail.

The seal 18 includes an annular trough 22 illustrated as encircling the ascension pipe 12 and fixed to the outside thereof a few inches below the top and extending approximately to the top. The lower end portion of the gooseneck 13 extends loosely into the trough. Typically the inside diameter $D_1$ of the trough is approximately one inch greater than the outside diameter $D_2$ of the lower end of the gooseneck. The height h of the trough is a little greater than the distance j, which is the distance the gooseneck extends into the trough, plus the distance g, which is approximately a half inch. However, these dimensions may vary and are not critical.

The trough 22 contains a body 23 of a non-coking non-flammable liquid into which the gooseneck extends. Our preferred choice of liquid is silicone, but possible alternatives are water or a water-glycol solution. Silicone has advantages in that it remains liquid throughout the temperature range encountered and does not significantly vaporize. It has a flash point over 500° F. and a freeze point −40° F. Water, by itself or as part of a water-glycol solution, evaporates quite rapidly and should be replenished continually. FIG. 1 shows diagrammatically an inlet line 24 for replenishing a water supply in the trough. Preferably we use water only as a temporary expedient.

FIG. 2 shows a modification in which we place an annular gasket 26 in the bottom of the trough 22. The end of the gooseneck 13 and the bottom of trough 22 bear against the gasket. We form the gasket of a closed cell sponge elastomer, preferably room temperature vulcanized (RTV) silicone, but other elastomers may be used. RTV silicone foam material comes in a two-part liquid form, but when mixed and poured into the trough, it expands to about three times its liquid volume while curing. Later we add liquid silicone to the annulus of the trough outside the gooseneck. It is of course possible to use other liquids in this form of the invention.

Steam condensate from the nozzle 17 or flushing fluid tends to leak, particularly in old equipment, and drip into the annulus of the trough 22 inside the gooseneck 13. The gasket 26 of FIG. 2 prevents drippings from mixing with liquid 23 in the outside annulus where the drippings would cause spitting of water and/or silicone liquid. Water which drips into the inside annulus subsequently evaporates at the operating temperature. The gasket 26 is pliable and does not interfere with relative movement of the ascension pipe 12 and gooseneck 13, but still adheres thereto.

FIG. 3 shows a modification in which the bottom of the trough 22 contains a layer 27 of granular material, such as sand, underlying the body 23 of liquid. The granular material extends to a height several inches above the end of the gooseneck 13 and serves essentially the same purpose as the gasket 26 of FIG. 2.

Figure 4:
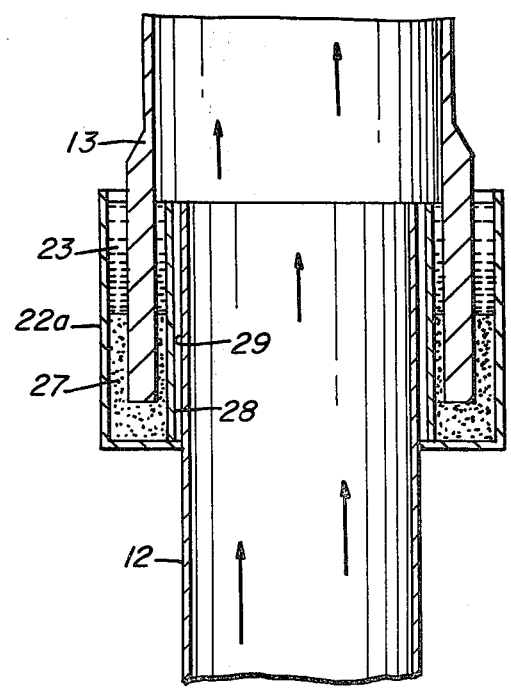
FIG. 4 is a vertical sectional view showing still another modified seal of our invention.

FIG. 4 shows another modification in which the trough 22a has a separate inside wall 28 spaced from the ascension pipe 12. The inside wall 28 forms an air space 29 between the trough and ascension pipe and trough. The air space serves to insulate the body of liquid from the heat of gases passing through the ascension pipe, and acts also as a trap for collecting drippings from the nozzle 17. We show a layer 27 of granular material in the trough 22a, but it is apparent we can omit the layer or use a gasket as in FIGS. 1 and 2 respectively.

From the foregoing description is is seen that our invention affords a simple effective seal for the gas offtake of a coke oven. In new equipment the nozzles do not leak and the gasket of FIG. 2 is not ordinarily needed. The gasket can be added later when the nozzle commences to leak. Silicone fluid samples, taken after three months' service, have shown unchanged fluid properties in laboratory tests and no tar build-up.

We claim:

1. In a combination which includes a coke oven, a collector main, and gas offtake piping, means for introducing fluid into said piping for flushing volatile materials from the gas, said piping including two communicating parts movable relatively to one another and a seal between said parts preventing escape of gases, the improvement in which said seal comprises a trough fixed to one of said parts and receiving an end of the other part, and a body of non-coking non-flammable liquid in said trough for preventing escape of gases between the two parts, said liquid being selected from the group consisting of silicone and water-glycol solution.

2. An improvement as defined in claim 1 in which said liquid is silicone.

3. An improvement as defined in claim 1 comprising in addition a gasket of a closed cell sponge elastomer in the bottom of said trough for preventing contact of flushing fluid with liquid in an outer annulus thereof to eliminate spitting and loss of said liquid therefrom, both said trough and the end of said other part bearing against said gasket.

4. An improvement as defined in claim 3 in which said elastomer is RTV silicone.

5. An improvement as defined in claim 1 comprising in addition a layer of granular material in the bottom of said trough and extending to a height above the bottom of said other part.

6. An improvement as defined in claim 1 in which said trough includes a separate inner wall forming an air space between the trough and the part to which the trough is fixed.

7. A combination as defined in claim 1 in which said piping includes an ascension pipe extending upwardly from said oven and a gooseneck communicating with said ascension pipe, said ascension pipe being the part to which said trough is fixed, said gooseneck being the part received in said trough.

8. A combination as defined in claim 1 in which said piping includes an ascension pipe extending upwardly from said oven and a gooseneck communicating with said ascension pipe, said seal being located between said gooseneck and said main.

* * * * *